(12) United States Patent
Wheals et al.

(10) Patent No.: US 8,844,697 B2
(45) Date of Patent: *Sep. 30, 2014

(54) CLUTCHES

(71) Applicant: Ricardo UK Ltd, West Sussex (GB)

(72) Inventors: Jonathan Charles Wheals, Warwickshire (GB); Lee Sykes, West Sussex (GB)

(73) Assignee: Ricardo UK Ltd, West Sussex (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/675,384

(22) Filed: Nov. 13, 2012

(65) Prior Publication Data

US 2013/0146416 A1 Jun. 13, 2013

Related U.S. Application Data

(62) Division of application No. 12/445,311, filed as application No. PCT/GB2007/003894 on Oct. 15, 2007, now Pat. No. 8,333,272.

(30) Foreign Application Priority Data

Oct. 13, 2006 (GB) .................................. 0620347.5
May 16, 2007 (GB) .................................. 0709409.7
Jun. 22, 2007 (GB) .................................. 0712091.8

(51) Int. Cl.
*F16D 13/72* (2006.01)
*F16D 21/06* (2006.01)

(52) U.S. Cl.
CPC ........ *F16D 13/72* (2013.01); *F16D 2021/0684* (2013.01); *F16D 2021/0615* (2013.01); *F16D 21/06* (2013.01); *F16D 2021/0607* (2013.01)

USPC ..................................... 192/70.12; 192/113.1

(58) Field of Classification Search
CPC ......................... F16D 13/72; F16D 2021/0615
USPC .................. 192/113.1, 113.21, 113.31, 113.4
See application file for complete search history.

(56) References Cited

U.S. PATENT DOCUMENTS 2,125,433 A 8/1938 Dunkelow
2,371,804 A 3/1945 Cooke
(Continued)

FOREIGN PATENT DOCUMENTS

DE 19710930 A1 10/1997
DE 102005025772 A1 1/2006
(Continued)

OTHER PUBLICATIONS

International Search Report for GB60720152.8 Claim 1 to 17, Date of Search Feb. 8, 2008, 2 pages.
(Continued)

*Primary Examiner* — Richard M. Lorence
(74) *Attorney, Agent, or Firm* — Gifford, Krass, Sprinkle, Anderson & Citkowski, P.C.

(57) ABSTRACT

A clutch assembly is disclosed having a driving plate arranged in communication with a thermal transfer medium for use in cooling the driving plate. The disclosed thermal transfer medium can include at least one conductive brush that is mounted with the driving plate and arranged between the driving plate and a separate cooled part of the clutch assembly for cooling the driving plate. The brush may also be resiliently biased for contact with the cooled part of the clutch assembly so that it brushes against it.

10 Claims, 6 Drawing Sheets

(56) References Cited

U.S. PATENT DOCUMENTS

| | | | |
|---|---|---|---|
| 2,853,892 A | 9/1958 | Sheppard | |
| 2,876,879 A * | 3/1959 | Maurice et al. | 192/84.91 |
| 2,909,258 A * | 10/1959 | Lacroix, Jr. | 192/113.1 |
| 3,021,931 A | 2/1962 | Holz | |
| 4,294,343 A | 10/1981 | Reh | |
| 4,474,268 A | 10/1984 | Dayen | |
| 4,697,678 A | 10/1987 | Kuno | |
| 5,072,816 A | 12/1991 | Takeuchi et al. | |
| 6,029,786 A | 2/2000 | Sommer | |
| 6,814,205 B2 * | 11/2004 | Feldhaus et al. | 192/48.9 |
| 6,910,561 B2 | 6/2005 | Sasse | |
| 7,287,634 B2 | 10/2007 | Agner et al. | |
| 7,527,136 B2 | 5/2009 | Gierling | |
| 7,631,739 B2 | 12/2009 | Enstrom | |
| 8,333,272 B2 * | 12/2012 | Wheals et al. | 192/113.31 |
| 2001/0025759 A1 | 10/2001 | Sarar | |
| 2003/0089569 A1 | 5/2003 | Antonov et al. | |
| 2003/0164274 A1 | 9/2003 | Feldhaus | |
| 2004/0234943 A1 | 11/2004 | Lepple-Wienhues | |
| 2005/0252745 A1 | 11/2005 | Vanselous et al. | |
| 2007/0068761 A1 | 3/2007 | Stevenson et al. | |
| 2011/0100779 A1 * | 5/2011 | Wheals | 192/113.3 |

FOREIGN PATENT DOCUMENTS

| | | | |
|---|---|---|---|
| EP | 0343765 | A2 | 11/1989 |
| EP | 1369613 | A1 | 12/2003 |
| EP | 1738951 | A2 | 1/2007 |
| EP | 1783388 | A2 | 5/2007 |
| GB | 458952 | A | 12/1936 |
| GB | 561014 | A | 5/1944 |
| GB | 1233968 | A | 6/1971 |
| GB | 1245956 | A | 9/1971 |
| GB | 1339000 | A | 11/1973 |
| GB | 1393285 | A | 5/1975 |
| GB | 2186331 | A | 8/1987 |
| GB | 2209194 | A | 5/1989 |
| GB | 2414050 | A | 11/2005 |
| GB | 2416573 | A | 2/2006 |
| JP | 61052424 | A | 3/1986 |
| SU | 914835 | A1 | 3/1982 |
| WO | 2008044047 | A2 | 4/2008 |

OTHER PUBLICATIONS

International Search Report for GB0720152.8 Claim 18 to 20, Date of Search Feb. 8, 2008, 2 pages.
International Search Report for GB0720152.8 Claim 21 tto 24, Date of Search Feb. 8, 2008, 2 pages.
International Search Report for GB60720152.8 Claim 25, Date of Search Feb. 8, 2008, 2 pages.
Notice on the First Office Action, Search Report Application / Patent No: 201110386095.1, Applicant/Patentee: Ricardo UK Ltd., Dec. 5, 2013, 3 pages.
Search Report Application / Patent No: 201110386095.1, Applicant/Patentee: Ricardo UK Ltd. Dec. 5, 2013, 11 pages.
Search Report Application / Patent No: 201110386093.2, Applicant/Patentee: Ricardo UK Ltd. Dec. 5, 2013, 11 pages.

* cited by examiner

CLUTCHES

CROSS-REFERENCE TO RELATED APPLICATIONS

This application is a Division of application Ser. No. 12/445,311 filed on Jul. 16, 2009. Application PCT/GB2007/003894 claims priority for Application 0620347.5 filed on Oct. 13, 2006 in the United Kingdom. Application PCT/GB2007/003894 claims priority for Application 0709409.7 filed on May 16, 2007 in the United Kingdom. Application PCT/GB2007/003894 claims priority for Application 0712091.8 filed on Jun. 22, 2007 in the United Kingdom.

FIELD OF THE INVENTION

The present invention relates to clutches, and more particularly, but not exclusively, to clutches for automotive applications, such as dual clutch transmissions.

BACKGROUND OF THE INVENTION

The performance of a friction clutch deteriorates with an increase in clutch plate temperature. For this reason, 'wet clutches' are known in which the clutch components are contacted by lubricating fluid to reduce friction and transfer heat.

Wet clutches are commonly used in automotive applications, such as in dual clutch transmissions. However, wet clutch assemblies generally introduce inefficiencies, such as through churning losses caused by drag between the lubricating oil and moving components within the assembly. Hence, there is a need to provide clutch cooling with reduced inefficiency.

Dual clutch transmissions typically include a pair of clutches, each having a driving plate and a pressure plate, for clamping a friction plate therebetween. There is a need to optimise the packaging and weight of such transmissions.

SUMMARY OF THE INVENTION

An object of the invention is to provide alternative means for cooling clutch plates. Another object of the invention is to provide an improved dual clutch transmission, more particularly, but not exclusively, an improved driving plate for a dual clutch transmission.

According to one aspect of the present invention, there is provided a driving plate for a clutch assembly, the driving plate having one or more internal passageways, ducts, chambers, or bores for receiving a thermal transfer medium.

The transfer medium is preferably a coolant fluid. The heat transfer medium may take the form of a heat tube, preferably of known construction (e.g. linear or rotary), or a conductive core, e.g. a copper core fitted within a bore in the driving plate.

Such arrangements can be used to reduce the temperature of a dry clutch assembly, to the extent that it may be possible to use a dry clutch assembly where previously a wet clutch assembly was deemed necessary, e.g. in a dual clutch transmission. The above arrangements are also suitable for use in wet clutch applications and other types of clutch assembly, e.g. wherein the driving plate is in the form of a flywheel. Hence, the term driving plate should be understood to mean a plate or driving member within a clutch against which a friction plate is intended to be clamped in use.

Preferably the driving plate includes a coolant circuit for receiving a flow of cooling fluid. The circuit may include one or more passageways extending within the plate. It may be preferred to locate the inlet and outlet of the circuit at a radially inner region of the plate, e.g. in or adjacent the central bore of an annular driving plate (whether in an axial end face of the plate or in a radial portion of the plate).

In preferred embodiments, the driving plate has opposing engagement surfaces, e.g. for use with opposing pressure plates in a dual clutch transmission. In such embodiments, it is preferred if the driving plate is cranked, so as to define a pair of parallel offset portions, each having an engagement surface. Said offset portions are preferably connected via an angled or transverse intermediate portion. This can reduce the overall length of the clutch assembly for a dual clutch transmission.

According to another aspect of the invention, there is provided a clutch assembly, preferably a dry clutch assembly, including a driving plate according to any of the above aspects of the invention. The clutch assembly is preferably part of a dual clutch transmission.

Such clutch assemblies are advantageous in that the driving plate is cooled in use and can be used to cool a friction plate within the clutch, via thermal transfer between the driving plate and the friction plate, e.g. when the two plates are engaged.

In a preferred embodiment, the clutch assembly is part of a dual clutch transmission having concentric input shafts, wherein the circuit has an inlet and an outlet which are arranged in communication with the inner of said input shafts. In another embodiment, the inlet and outlet are arranged in communication with the outer of said input shafts.

In each case, a sleeve or insert may be provided within the communicating input shaft, for separating the cylindrical volume of the shaft, so as to define inlet and outlet pathways for fluid in said circuit.

In a preferred embodiment, the circuit has an inlet arranged in communication with the inner input shaft and an outlet arranged in communication with the outer input shaft.

The circuit preferably includes means for promoting the flow of coolant fluid through the driving plate, such as spiral, auger type projections. The flow promoting means are preferably formed in the transmission input shafts, and may take the form of integrally machined formations. Additionally or alternatively, the formations may form part of the sleeve/insert. The sleeve/insert may be rotatable with the shaft, but is preferably fixed against rotation, for promoting fluid transfer.

Conveniently, the circuit may be arranged in communication with the engine cooling circuit of a vehicle.

The coolant fluid may be taken directly from the engine cooling circuit. Alternatively, there may be a separate circuit, e.g. containing water or another coolant fluid, which communicates with the engine cooling circuit via a heat exchanger. In either case, the coolant fluid may be directed to a heat rejection device on exiting the driving plate.

In order to deal with packaging constraints at the engine side of the clutch (and indeed to avoid the need for significant modifications to the engine), it is preferred if the circuit includes a conduit which directs a flow of coolant fluid away from the engine to the transmission side of the clutch. The coolant may then be supplied to the driving plate along a passageway inside one of the transmission input shafts, for example.

The driving member is preferably supported on one or more bearings, e.g. a bearing located on the inner or outer input shafts of a dual clutch transmission.

Flow control means, for example one or more controlled valves or a thermostatic control, may be provided for controlling the flow of cooling fluid to or from the plate.

According to a further aspect of the invention, there is provided a clutch assembly, preferably a dry clutch assembly, having a driving plate which is arranged in communication with a thermal transfer medium for use in cooling the driving plate.

The thermal transfer medium is preferably arranged to communicate with a non-engagement surface of the driving plate, i.e. a portion of the plate which is not intended for use in engaging another plate within the clutch, and so the thermal transfer medium is distinct from a gas (e.g. air) or a liquid (e.g. lubricating oil) which is specifically intended to come into contact with the engagement surface of a driving plate such as a flywheel so as to cool said surface.

Preferably, the thermal transfer medium is arranged for communication with the driving plate at a radially inner region of the driving plate, e.g. at or adjacent the internal bore of annular driving plate.

The thermal transfer medium may include one or more conductive elements mounted on or in contact with driving plate, e.g. to allow for heat transfer between the driving plate and an externally cooled component. Additionally or alternatively, the thermal transfer medium may take the form of or include a conductive powder and/or a conductive fluid in contact between the driving plate and an externally cooled component.

In a preferred embodiment, the clutch assembly is part of a dual clutch transmission and the externally cooled component is in the form of an input shaft of said transmission which may be cooled via a flow of cooling fluid adjacent or within the shaft or via an oil bath at a location remote from the clutch. The thermal transfer medium may be arranged between the shaft and the driving plate for thermal transfer between the shaft and driving plate.

It may be preferred to isolate the thermal transfer medium in a cartridge that can be arranged in communication with the driving plate and the externally cooled component. One or more walls of the cartridge are preferably of a conductive material, e.g. a metal such as copper.

In preferred embodiments, the driving plate has opposing engagement surfaces, e.g. for use with opposing pressure plates in a dual clutch transmission. In such embodiments, it is preferred if the driving plate is cranked, so as to define a pair of parallel offset portions, each having an engagement surface. Said offset portions are preferably connected via an angled or transverse intermediate portion.

In each of the above aspects of the invention, cooling of the driving plate can improve the functionality of the clutch assembly by stabilising the frictional characteristics, thereby affording better control and improved shift quality. It can also be useful in reducing the cost of the friction materials of the clutch, whereby a lower specification of friction facing can be employed than would otherwise be required. It may also be of assistance in reducing the size and mass or inertia required for a given application.

According to another aspect of the invention, there is provided a clutch assembly having a driving plate coupled to a pressure plate by a conductive element for the thermal transfer between the driving plate and the pressure plate.

Conveniently, the conductive element may be fixedly secured to the driving plate and/or the pressure plate.

The conductive element may take the form of a metallic element, such as a strip of sprung copper or copper foil. In a preferred embodiment, the conductive element is in the form of a flexible copper braid, which is preferably pinned or otherwise fastened to either plate. In another embodiment, the conductive element is in the form of a copper bellows.

Conveniently, the conductive element may be of generally annular form. One or more additional conductive elements may be incorporated for thermal transfer between the driving plate and pressure plate.

It is most preferred if the driving plate is subject to cooling, e.g. having one or more internal chambers for receiving a cooling fluid, and/or wherein the driving plate is arranged in communication with a conductive powder and/or a conductive fluid and/or conductive brushes, preferably as part of a dry clutch assembly.

In the above embodiments, thermal transfer is able to take place between the cooling medium and the driving plate, so as to cool the driving plate. Further thermal transfer takes place between the driving plate and the or each pressure plate, via the or each conductive element.

In preferred embodiments, the driving plate has opposing engagement surfaces, e.g. for use with opposing pressure plates in a dual clutch transmission. In such embodiments, it is preferred if the driving plate is cranked, so as to define a pair of parallel offset portions, each having an engagement surface. Said offset portions are preferably connected via an angled or transverse intermediate portion.

According to still further aspect of the invention, there is provided a dual plane driving plate having opposing engagement surfaces, e.g. for use with opposing pressure plates in a dual clutch transmission.

Such an arrangement is advantageous in that it can reduce the length of a clutch assembly.

In such embodiments, it is preferred if the driving plate is cranked, so as to define a pair of parallel offset portions, each having an engagement surface. Said offset portions are preferably connected via an angled or transverse intermediate portion.

According to yet a further aspect of the invention, there is provided a dual clutch transmission including a single driving plate having first and second engagement surfaces for engagement with first and second friction plates.

The driving plate is preferably cranked, so as to define a pair of parallel offset portions, each having an engagement surface. Said offset portions are preferably connected via an angled or transverse intermediate portion. In other embodiments, the engagement surfaces are not parallel with one another. For example, the first engagement surface may be configured for extending in a generally radial direction in use, e.g. perpendicular to the axis of rotation, whereas the second engagement is arranged at and angle, forward or rearward, to said first engagement surface, e.g. anywhere between at 5 and 90 degrees relative to the first engagement surface. In one embodiment, the first engagement surface is perpendicular to the second engagement surface. In other embodiments, the second engagement surface is arranged at 15, 30, 45, 60, or 75 degrees relative to the first engagement surface.

In a preferred embodiment, the transmission includes a driving plate defining concentric engagement surfaces, concentric friction plates, concentric pressure plates, and first and second clutch springs for operation of the pressure plates in clamping the friction plates against their respective engagement surface on the driving plate.

Preferably, the driving plate has a top hat type configuration, whereby the engagement surfaces are axially off set from one another.

Preferably, the outer pressure plate is in axial alignment with the radially inner portion of the driving plate, and the inner pressure plate is in axial alignment with the radially outer portion of the diving plate. Preferably, the friction plates are arranged in axial alignment with one another.

BRIEF DESCRIPTION OF THE DRAWINGS

Other aspects and features of the invention will be readily apparent from the claims and the following description of preferred embodiments, made by way of example only, with reference to the accompanying drawings, in which:

DETAILED DESCRIPTION OF THE PREFERRED EMBODIMENTS

Figure 1:
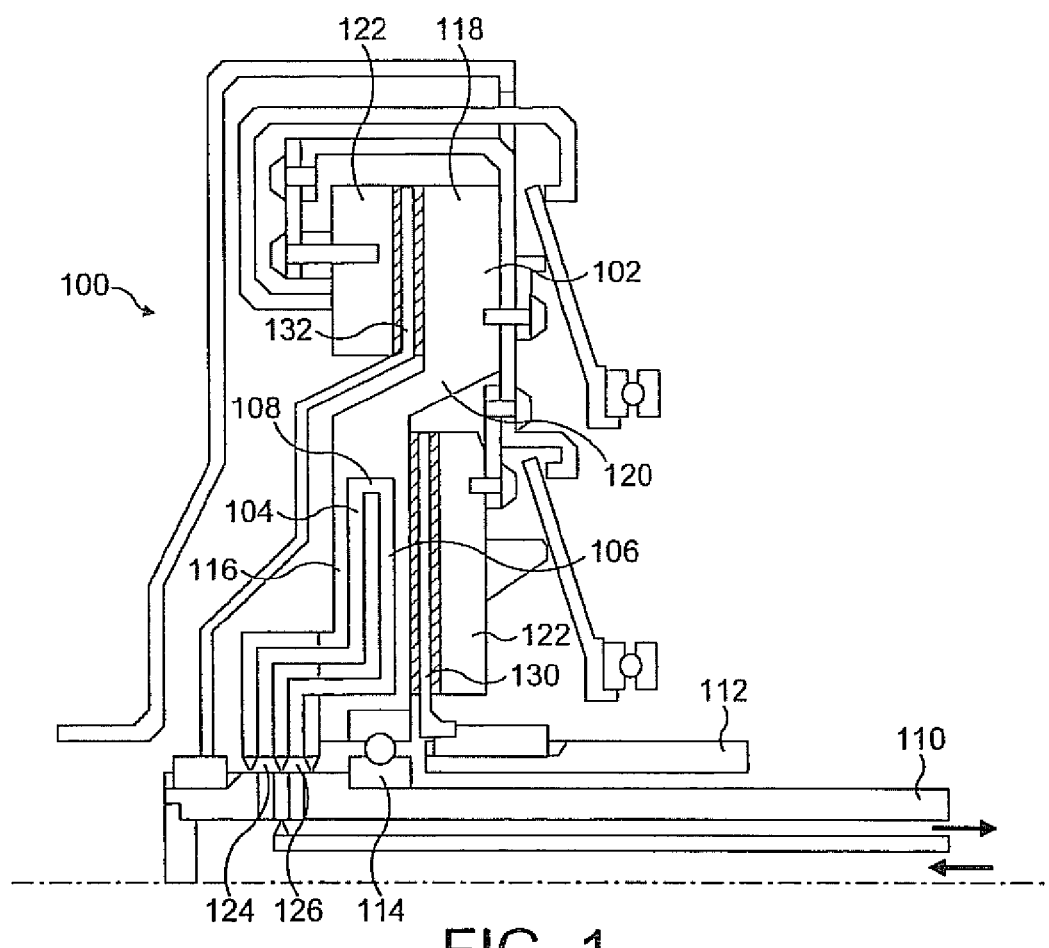
FIG. 1 is a schematic cross sectional view through a dry clutch assembly.

A liquid-cooled dry clutch assembly is indicated generally at 100 in FIG. 1, which includes a driving plate 102 having a series of internal bores or passageways. More particularly, the illustrated plate 102 has two parallel and radially extending passageways 104, 106 connected to one another by a relatively short transverse passageway 108. The passageways 104, 106 form part of a circuit for directing a flow of cooling fluid into and out of the driving plate 102 at a radially inner portion of the plate 102.

In this embodiment, the clutch assembly 100 is part of a dual clutch transmission (DCT), having concentric input shafts 110, 112. The driving plate 102 is supported on a bearing 114 located on the inner shaft 110, although it could be supported on the outer shaft 112.

To reduce the axial length of the assembly, the driving plate 102 is cranked so as to define two parallel and offset portions 116, 118 connected to one another via a transition portion 120. Each offset portion 116, 118 has an engagement surface arranged to cooperate with a respective pressure plate 122 for clamping a respective friction plate 130, 132 of the DCT. The friction plates 130, 132 are splined onto their respective shaft 110, 112.

In this embodiment, the cooling circuit only extends into the radially inner offset portion 116, although in other embodiments it may extend into both portions 116, 118, e.g. substantially along the entire radial dimension of the plate 102.

As illustrated, the cooling circuit has an inlet 124 and an outlet 126 arranged in communication with the inner shaft 108 of the DCT. A sleeve 128 is provided within the shaft 110 for separating the cylindrical volume of the shaft 110, so as to define inlet and outlet flow paths for the cooling fluid. The arrows in FIG. 1 denote the direction of coolant flow for this embodiment.

In this embodiment, the coolant fluid is taken directly from the engine cooling circuit. Flow control means, for example one or more valves or a thermostatic controls (not shown) may be provided for controlling the flow of cooling fluid to or from the plate 102.

In use, a flow of coolant fluid is provided through the passageways 104, 106, 108 in order to cool the plate 102. Thermal transfer occurs within the plate 102 leading to a cooling of the external surface of the plate 102. Thermal transfer also occurs across the engaged plates during use. The flow of coolant through the circuit can be continuous or selectively controlled, for example to ensure that there is sufficient flow or cooling under specific vehicle driving conditions, e.g. under heavy load conditions.

In a most simple embodiment (not illustrated) the driving plate includes a single fluid receiving chamber, preferably extending in a generally radial direction, and more preferably to a radial outer region of the plate.

The cooling chamber/circuits referred to above may be incorporated in the driving plates of wet or dry clutch assemblies, including in 'single plane' driving plates.

Figure 2:
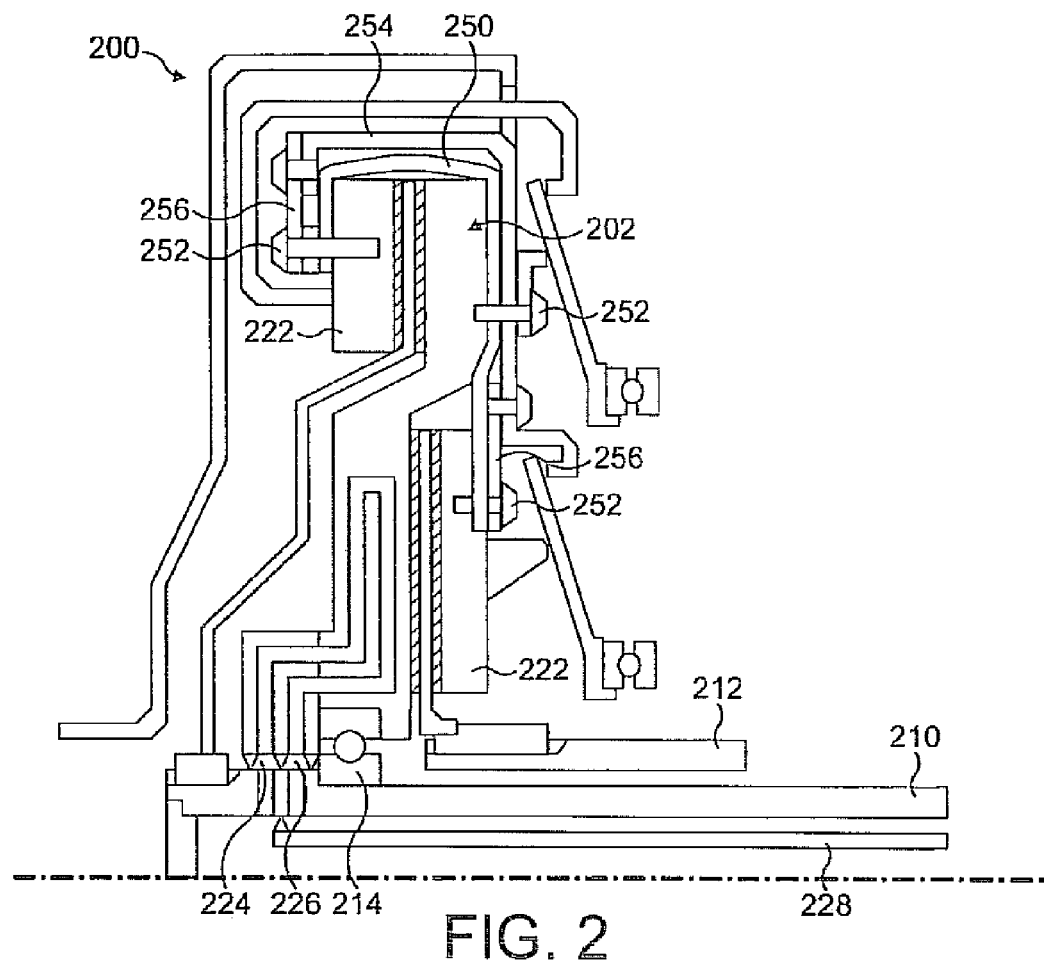
FIG. 2 is similar to FIG. 1, showing a modified dry clutch assembly.

Referring now to FIG. 2, a further dry clutch assembly is indicated at 200. The assembly 200 is similar in many ways to the assembly 100 described above and so it will not be described in detail. Common features are given the same reference numerals, albeit with a prefix 2—.

A conductive element 250, which in his embodiment is in the form of an annular metallic braid, is arranged in communication between the driving plate 202 and the pressure plates 222. In particular, the braid is fastened to the respective plates by pins 252, so as to be fixed for rotation with the driving plate 202 and pressure plates 222.

In addition to any heat exchange across the engaging surfaces of the driving plate in use, thermal transfer is effected between the driving plate 202 and the pressure plates 222 via the conductive element 250. Hence, as the driving plate 202 is cooled internally by the coolant circuit, a cooling effect is experienced by the pressure plates 22, via the braid 250.

In the drawings, the conductive element 250 is shown in abutment with the steel member 254 by means of which the sprung steel torque straps 256 are connected to the outer pressure plate 222. However, it is preferred if a spacing exists between the steel 254 and the conductive element 250.

It may be preferred if the torque straps 256 are made from a highly conductive material such as beryllium copper, rather than conventional sprung steel. Indeed, by using highly conductive torque straps 256, it is possible to obviate the need for the conductive element 250, whereby thermal transfer occurs between the driving plate 202 and the pressure plates 222, via the torque straps 256 and steel 254. The applicant reserves the right to claim independent protection for this feature.

One or more additional conductive elements may be incorporated. It may be preferred to have a dedicated conductive element associated with each pressure plate in addition to or as an alternative to one common element for both pressure plates.

Figure 2A:
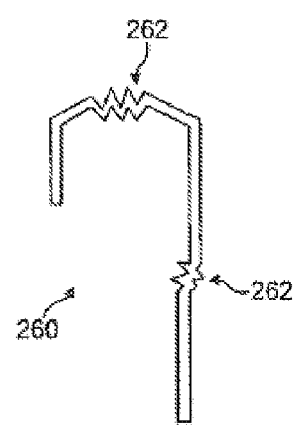
FIG. 2A is a schematic view of a bellows for use in the clutch assembly of FIG. 2.

In certain embodiments, the conductive element may take the form of a bellows, e.g. of copper. An example is shown at 260 in FIG. 2A, the bellows 260 having convolutions 262.

Figure 3:
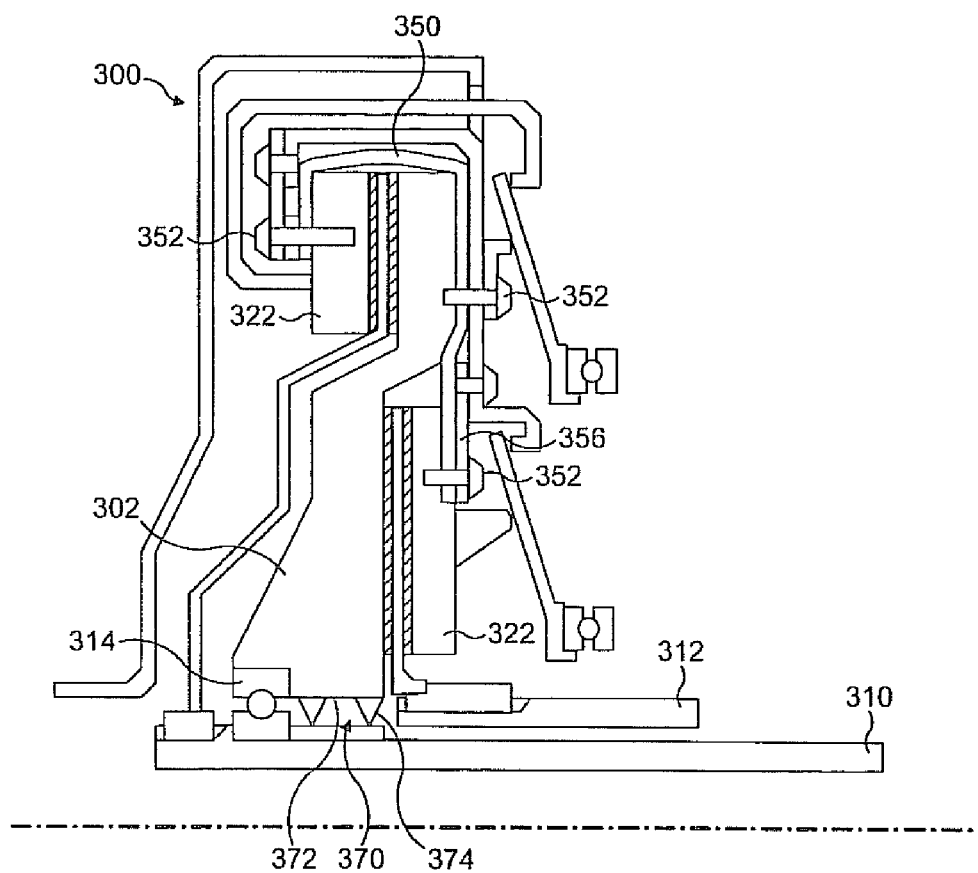
FIG. 3 is similar to FIGS. 1 and 2 and shows an alternative dry clutch assembly.

Referring now to FIG. 3, a modified dry clutch assembly is indicated at 300. The assembly 300 is similar in many ways to the assemblies 100, 200 described above and so it will not be described in detail. Common features are given the same reference numerals, albeit with a prefix 3—.

Cooling of the driving plate 302 is effected by a cooling medium (indicated generally at 370) which is arranged in communication with a radially inner portion of the driving plate 302 and a separate cooled part of the clutch assembly 300. A seal 374 is provided on either side of the void for the cooled medium 370.

In this embodiment, the radially inner surface is in actual fact a cylindrical face 372 of the driving plate 302. Moreover, the cooling medium 370 is arranged between said face 372 and a portion of the inner shaft 310 of the dual clutch transmission. The inner shaft 310 is subject to cooling, e.g. from oil at a location remote from the plates 302, 322, or via a flow of cooling fluid adjacent to or within the shaft 310 (e.g. in a manner similar to FIG. 1).

The cooling medium 370 may take the form of conductive brushes (solid or flexible), e.g. connected to the driving plate 302 and/or the shaft 310, whereby thermal transfer between the shaft 310 to the driving plate 302, via the brushes, can serve to cool the driving plate 302.

Figure 3A:
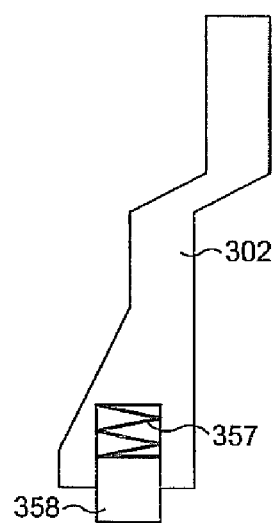
FIG. 3A is a schematic view of a modified driving plate including a conductive brush.

FIG. 3A shows a modified driving plate 302 of cranked configuration, which incorporates block 358 of conductive material such as copper mounted on a spring 357, wherein the block is configured to brush against an externally cooled component, for example inner shaft 310, against the action of the spring 357, in order to cool the driving plate 302. Multiple brushes can be provided in radial tracks within the spring void. Thermally conductive paste is preferably used between those surfaces intended to transfer heat.

Figure 4:
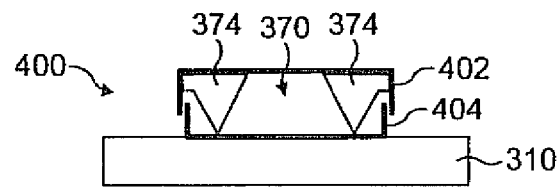
FIG. 4 is a schematic view of a heat transfer cartridge for use in the assembly of FIG. 3.

In preferred embodiments, the cooling medium may be in the form of a conductive powder and/or fluid which is held in a sealed manner between the driving plate 302 and the shaft 310. FIG. 4 shows a cartridge 400 consisting of inner and outer shells 402, 404 which are configured for co-rotation with their respective mating parts 302, 310. The shells 402, 404 are made from copper, so as to facilitate thermal transfer between the drive plate 302, cooling medium 370 and shaft 310. Again, a thermally conductive paste can be applied between mating surfaces to further enhance thermal transfer.

The seals 374 are compressed between the shells 402, 404 so as to maintain a positive pressure in the conductive medium 370, so as to maintain a high degree of 'wetting' contact with the respective inner surfaces of the shells 402, 404.

Figure 5:
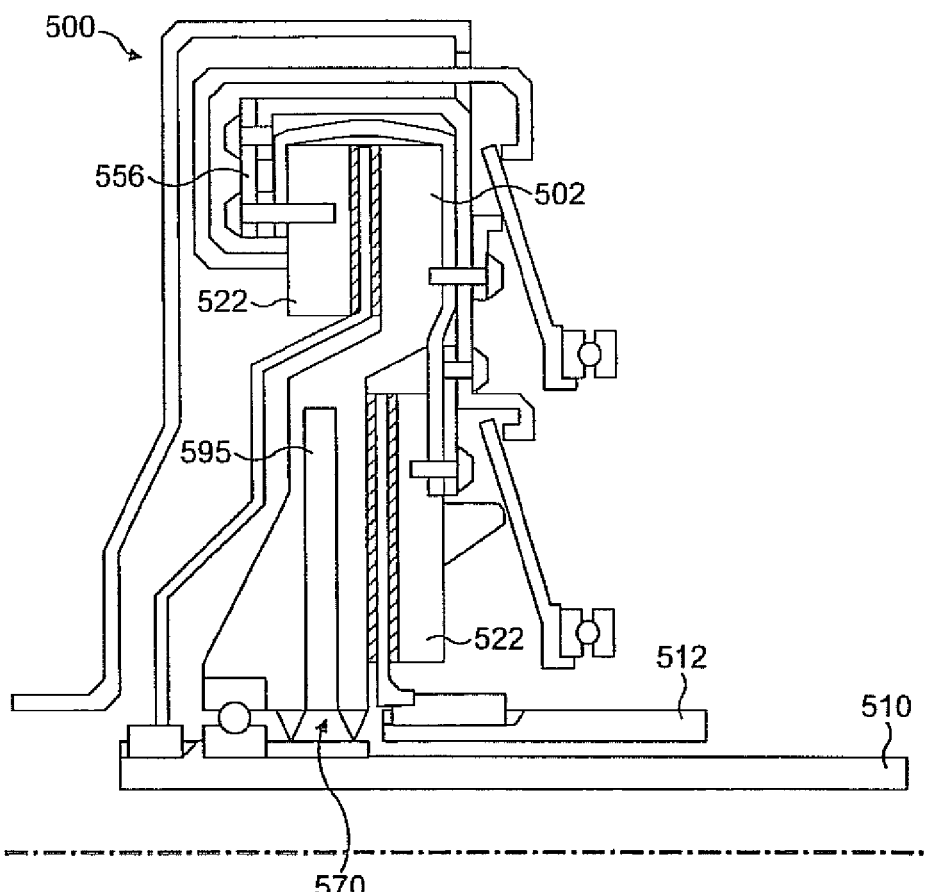
FIG. 5 is similar to FIG. 3 and shows a further dry clutch assembly with a conductive core.

Although a conductive element 350, 550 is shown between the pressure plates 322, 522 and the driving plate 302, 502 in FIGS. 3 and 5, it is maybe omitted, if preferred.

Referring now to FIG. 5, a modified dry clutch assembly is indicated at 500. The assembly 500 is similar in many ways to the assemblies 100, 200, 300 described above and so it will not be described in detail. Common features are given the same reference numerals, albeit with a prefix 5—.

In this embodiment, the driving plate 502 includes an internal conduit 595, which can be used to contain a thermal transfer medium, such as a cast copper core, for cooling the driving plate 502 via the thermal transfer medium 570 between the driving plate 502 and the externally cooled component. This can be used in combination with other cooling features of the kind described herein, if desired. Indeed, any combination of the conductive or cooling features shown or described in relation to FIGS. 1 to 5 can be used, as required.

Figure 6:
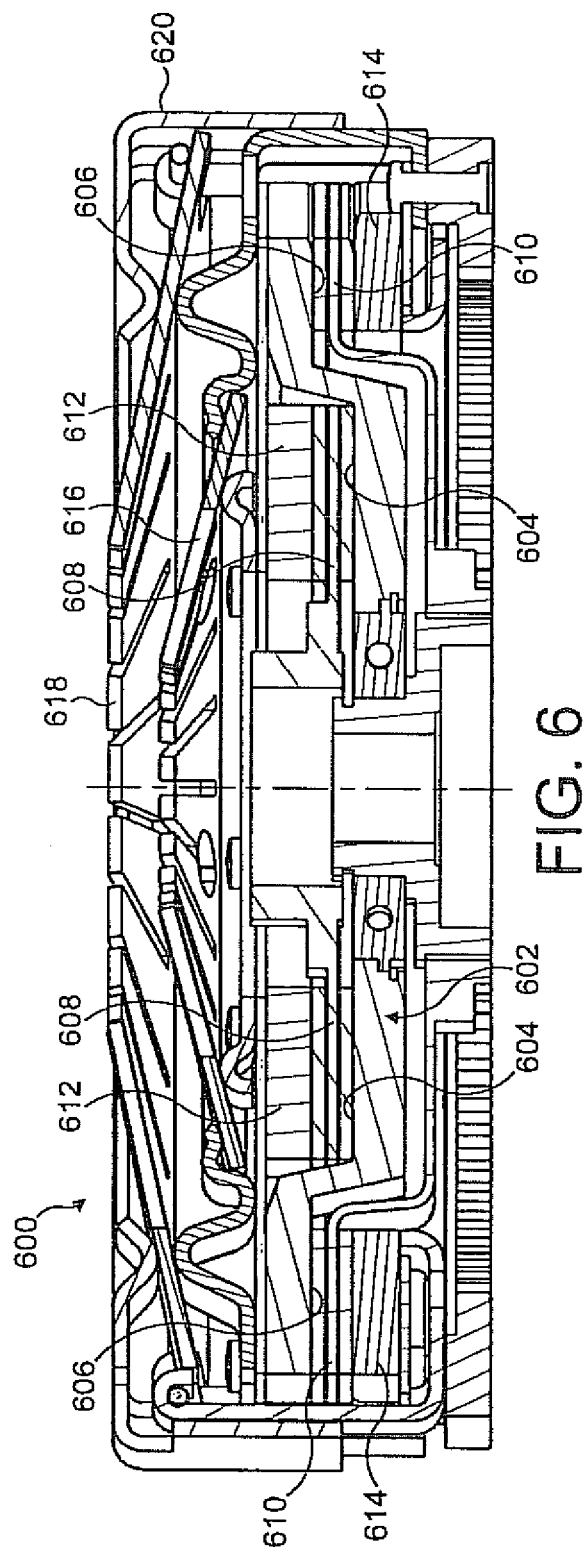
FIG. 6 is a schematic cross-section through of a nested dry DCT arrangement.
Figure 7:
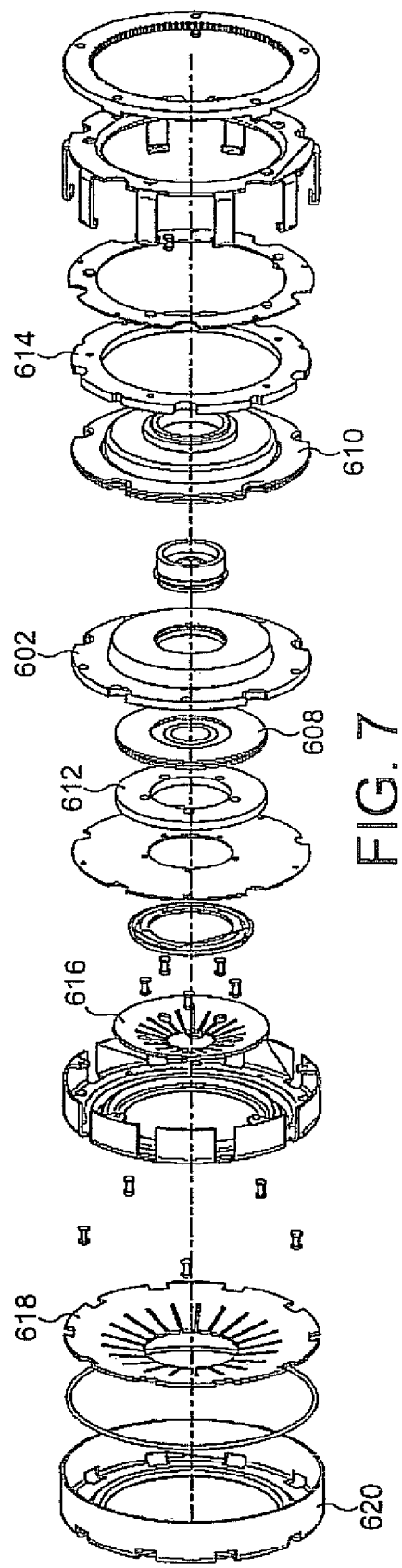
FIG. 7 is an exploded view of the DCT arrangement from FIG. 6.

Referring now to FIGS. 6 and 7, a nested DCT assembly is indicated generally at 600.

The assembly 600 includes a driving plate 602 defining concentric engagement surfaces 604, 606, concentric friction plates 608, 610, concentric pressure plates 612, 614. The assembly 600 further includes first and second clutch springs 616, 618 for operation of the pressure plates 612, 614 in clamping the friction plates 608, 610 against their respective engagement surfaces 604, 606 on the driving plate 602. The above components are mounted in a housing 620.

The driving plate 602 has a top hat type configuration, whereby the engagement surfaces 604, 606 are axially off set from one another. In this embodiment, the outer pressure plate 614 is in axial alignment with the radially inner portion of the driving plate 602, and the inner pressure plate 612 is in axial alignment with the radially outer portion of the driving plate 602. Moreover, the friction plates 608, 610 are in axial alignment with one another. The outer pressure plate 614 has a top hat configuration, whereas the inner pressure plate 612 is generally planar.

Specific operation of the clutch will be understood by the skilled addressee and is not described herein.

It should be noted that the assemblies 100, 200, 300, 500, 600 are configured to be open under normal operating conditions, whereby pressure has to be applied to engage the clutch.

Although the illustrated embodiments relate to clutch assemblies for dual clutch transmissions, it will be understood that many of the principles described herein are equally applicable to single plate clutch assemblies and single clutch transmissions, whether normally open or normally closed, and other types of wet or dry clutch assembly.

The cooling arrangements described and illustrated herein are applicable to any driving plate for a clutch, whether cranked, planar or otherwise configured.

The invention claimed is:

1. A clutch assembly having a driving plate arranged in communication with a thermal transfer medium for use in cooling the driving plate, wherein the thermal transfer medium is at least one conductive brush mounted with the driving plate and arranged between the driving plate and a separate cooled part of the clutch assembly for cooling the driving plate and the brush being resiliently biased for contact with said cooled part of the clutch assembly so that it brushes against said cooled part of the clutch assembly.

2. A clutch assembly according to claim 1 wherein the brush projects from a cylindrical surface of the driving plate for contact with a separate part of the clutch assembly.

3. A clutch assembly according to claim 1 wherein the driving plate includes a recess, with multiple conductive brushes mounted in said recess and biased for contact with an externally cooled part of the clutch assembly for cooling the driving plate.

4. A clutch assembly according to claim 1 wherein the thermal transfer medium is arranged to communicate with a non-engagement surface of the driving plate.

5. A clutch assembly according to claim 1 wherein the thermal transfer medium includes one or more conductive elements mounted on or in contact with the driving plate configured to allow for heat transfer between the driving plate and an externally cooled component of the clutch assembly.

6. A clutch assembly according to claim 1 wherein the thermal transfer medium is in the form of a conductive powder and/or fluid which is held in a sealed manner between the driving plate and a separate part of the clutch assembly and arranged for thermal transfer between the driving plate and said separate part of the clutch assembly.

7. A clutch assembly according to claim 6 wherein the thermal transfer medium is held in a conductive cartridge between the driving plate and the separate part of the clutch assembly.

8. A clutch assembly according to claim 1 wherein the driving plate is coupled to a pressure plate by a conductive element for the thermal transfer between the driving plate and the pressure plate.

9. A clutch assembly having a driving plate arranged in communication with at least one conductive brush mounted in a recess of the driving plate and arranged between the driving plate and a separate cooled part of the clutch assembly for cooling the driving plate so as to brush against said cooled part of the clutch assembly.

10. A clutch assembly having a driving plate arranged in communication with at least one conductive brush arranged for communication with the driving plate at a radially inner region of the driving plate and between the driving plate and a separate cooled part of the clutch assembly for cooling the driving plate.

* * * * *